(12) United States Patent
Taniguchi (10) Patent No.: US 9,995,343 B2
(45) Date of Patent: Jun. 12, 2018

(54) ROLLING BEARING (71) Applicant: JTEKT CORPORATION, Osaka-shi, Osaka (JP)

(72) Inventor: Youzou Taniguchi, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 25 days.

(21) Appl. No.: 15/355,579

(22) Filed: Nov. 18, 2016

(65) Prior Publication Data

US 2017/0146067 A1   May 25, 2017

(30) Foreign Application Priority Data

Nov. 25, 2015   (JP) .................................. 2015-229933

(51) Int. Cl.
| | |
|---|---|
| *F16C 35/06* | (2006.01) |
| *F16C 35/067* | (2006.01) |
| *F16C 19/52* | (2006.01) |
| *F16C 33/58* | (2006.01) |
| *F16C 19/16* | (2006.01) |
| *F16C 19/06* | (2006.01) |

(52) U.S. Cl.
CPC ............ *F16C 35/067* (2013.01); *F16C 19/52* (2013.01); *F16C 33/586* (2013.01); *F16C 19/06* (2013.01); *F16C 19/16* (2013.01); *F16C 2226/00* (2013.01); *F16C 2380/26* (2013.01)

(58) Field of Classification Search
CPC .............................. F16C 33/583; F16C 33/586
See application file for complete search history.

(56) References Cited

U.S. PATENT DOCUMENTS

| | | | | | |
|---|---|---|---|---|---|
| 3,588,205 | A | * | 6/1971 | Daugherty | .............. F16C 27/04 384/473 |
| 3,619,017 | A | * | 11/1971 | Robinson | .............. F16C 19/163 384/513 |
| 4,509,871 | A | * | 4/1985 | Herzog | ................. F16C 19/166 384/502 |
| 4,548,518 | A | * | 10/1985 | Ravinale | ................. D01H 7/56 384/469 |
| 5,310,268 | A | * | 5/1994 | Schlereth | .............. F16C 19/184 384/512 |

(Continued)

FOREIGN PATENT DOCUMENTS

| | | | | |
|---|---|---|---|---|
| FR | 3020420 A1 | * | 10/2015 | ............ F16C 35/063 |
| JP | 2006-322579 A | | 11/2006 | |

*Primary Examiner* — Thomas R Hannon
(74) *Attorney, Agent, or Firm* — Oliff PLC (57) ABSTRACT

A rolling bearing includes an inner ring, an outer ring, a plurality of balls, and a cage that holds the balls. The inner ring is a rotating ring, and the outer ring is a fixed ring. An annular groove for creep suppression is formed in a fitting surface of the rolling bearing that is fitted on a mating member to which the outer ring is attached. The annular groove has a groove main body portion and inclined groove portions located on opposite sides of the groove main body portion in an axial direction and formed to be shallower than the groove main body portion such that the depth of each of the inclined groove portions increases toward the groove main body portion. The inclined groove portions come into contact with the mating member when the outer ring is elastically deformed by a radial load received from the balls.

6 Claims, 8 Drawing Sheets

(56) References Cited

U.S. PATENT DOCUMENTS 8,596,876 B2* 12/2013 Olschewski ............ F16C 19/28
  384/569
2010/0158424 A1* 6/2010 Muramatsu ........... F16C 35/067
  384/548

* cited by examiner

ROLLING BEARING

INCORPORATION BY REFERENCE

The disclosure of Japanese Patent Application No. 2015-229933 filed on Nov. 25, 2015 including the specification, drawings and abstract, is incorporated herein by reference in its entirety.

BACKGROUND OF THE INVENTION

1. Field of the Invention

The invention relates to a rolling bearing.

2. Description of the Related Art

Figure 10:
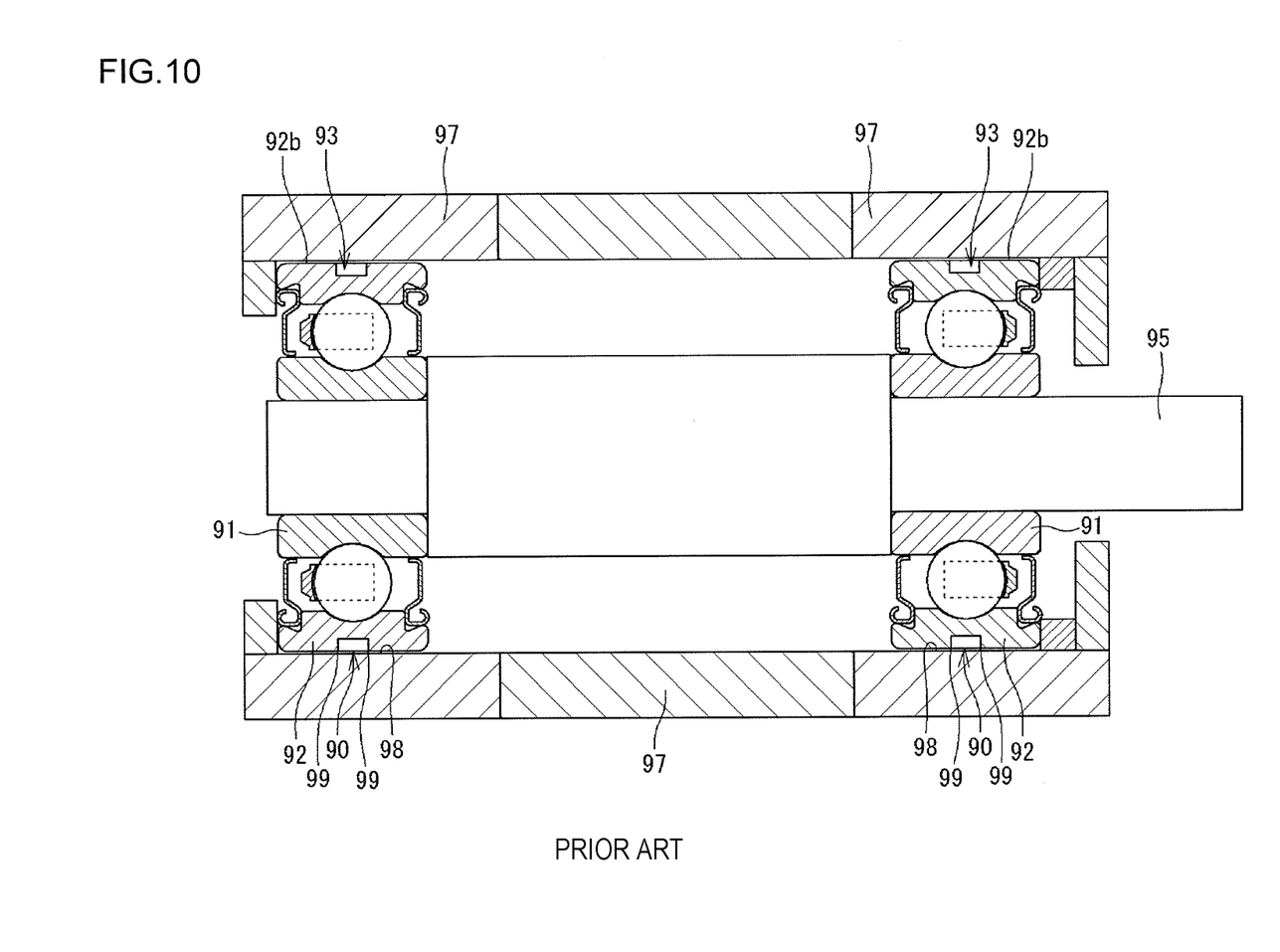
FIG. 10 is a sectional view illustrating a conventional rolling bearing.

Many rolling bearings are used for various types of industrial equipment. A rolling bearing includes an inner ring, an outer ring, a plurality of rolling elements, and a cage. The rolling elements are interposed between the inner ring and the outer ring. The cage holds the rolling elements. For example, in each rolling bearing 90 that supports a rotating shaft 95 in a housing 97, an inner ring 91 is fitted over and attached to the rotating shaft 95, and an outer ring 92 is attached to an inner peripheral surface 98 of the housing 97, as depicted in FIG. 10.

In particular, when the rolling bearing 90 is a deep groove ball bearing and is subjected to an axial load in one direction, the inner ring 91 and the rotating shaft 95 are assembled in a "interference fit" state. In contrast, the outer ring 92 and the housing 97 are often assembled in a "clearance fit" state. Thus, in a use state where the rotating shaft 95 is rotating, creep (slip of the outer ring 92 with respect to the housing 97 in a circumferential direction) is likely to occur between the outer ring 92 and the housing 97.

Thus, a rolling bearing has been proposed in which a groove (annular groove) is formed in an outer peripheral surface 92b of the outer ring 92 to suppress possible creep (see Japanese Patent Application Publication No. 2006-322579 (JP 2006-322579 A)). This rolling bearing 90 enables suppression of creep that is likely to occur when a heavy load is imposed on the bearing in a radial direction. The creep that is likely to occur when such a load is imposed on the bearing causes the outer ring 92 to slip slowly in the same direction as a rotating direction of the bearing.

As described above, the annular groove 93 formed in the outer peripheral surface 92b of the outer ring 92 enables the above-described creep to be suppressed if a heavy load is imposed on the rolling bearing in the radial direction. However, the heavy radial load causes corners 99 of the annular groove 93, which face each other in the axial direction, to come into contact with the housing 97. This leads to a local increase in a contact surface pressure on portions of the housing 97 that are contacted by the corners 99. In this case, even slight creep of the outer ring 92 makes wear of the housing 97 likely to progress.

SUMMARY OF THE INVENTION

An object of the invention is to suppress a local increase in a contact surface pressure generated on a mating member to which a fixed ring of a rolling bearing is attached when an annular groove is formed in the fixed ring in order to suppress possible creep.

A rolling bearing according to an aspect of the invention includes: an inner ring; an outer ring; a plurality of rolling elements interposed between the inner ring and the outer ring; and a cage that holds the rolling elements. One of the inner ring and the outer ring is a rotating ring and the other is a fixed ring. A fitting surface of the fixed ring attached to a mating member is formed as a first partial peripheral surface and a second partial peripheral surface each of which is a surface of the fixed ring facing the mating member in a radial direction. The first partial peripheral surface is arranged on one side in an axial direction, and the second partial peripheral surface is arranged on the other side in the axial direction. An annular groove for creep suppression is formed between the first partial peripheral surface and the second partial peripheral surface. The annular groove has a groove main body portion and inclined groove portions located on opposite sides of the groove main body portion in the axial direction and formed to be shallower than the groove main body portion such that a depth of each of the inclined groove portions increases toward the groove main body portion. The inclined groove portions come into contact with the mating member when the fixed ring is elastically deformed by a radial load received from the rolling elements.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
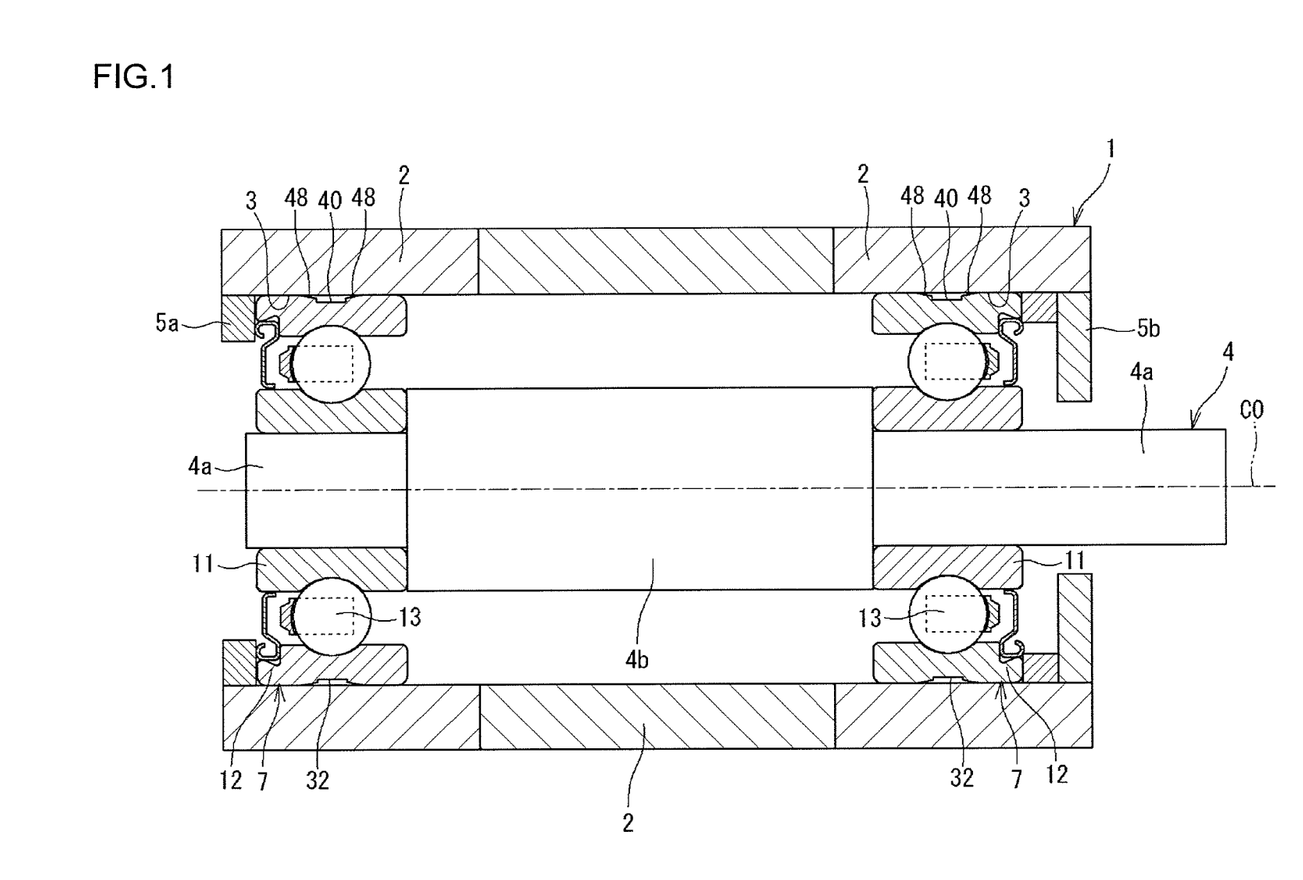
FIG. 1 is a longitudinal sectional view depicting an embodiment of a rotating apparatus including a rolling bearing in the invention.

Embodiments of the invention will be described based on the drawings. FIG. 1 is a longitudinal sectional view depicting an embodiment of a rotating apparatus 1 including a rolling bearing 7 in the invention. The rotating apparatus 1 has a housing 2 and a rotating shaft 4. The rotating shaft 4 is rotatably supported in the housing 2 by a pair of rolling bearings 7, 7. The rotating shaft 4 has small-diameter shaft portions 4a, 4a and a large-diameter shaft portion 4b. The rolling bearings 7, 7 are attached to the respective small-diameter shaft portions 4a, 4a. The large-diameter shaft portion 4b is interposed between the rolling bearings 7, 7 (inner rings 11, 11) and is larger in outside diameter than the small-diameter shaft portion 4a.

Annular portions 5a, 5b are provided on opposite sides of an inner peripheral surface 3 of the housing 2 (also referred to as a housing inner peripheral surface 3) in an axial direction. The rolling bearings 7, 7 are bearings for motors to which a preload is applied. The rolling bearings 7, 7 are subjected to a load (preload) in one direction along an axial direction.

The rolling bearing 7 on one side (in FIG. 1, a right side) in the axial direction has the same configuration as that of the rolling bearing 7 on the other side (in FIG. 1, a left side) in the axial direction. As a representative, the rolling bearing 7 on one side (in FIG. 1, the right side) in the axial direction will be described in detail in terms of configuration.

Figure 2:
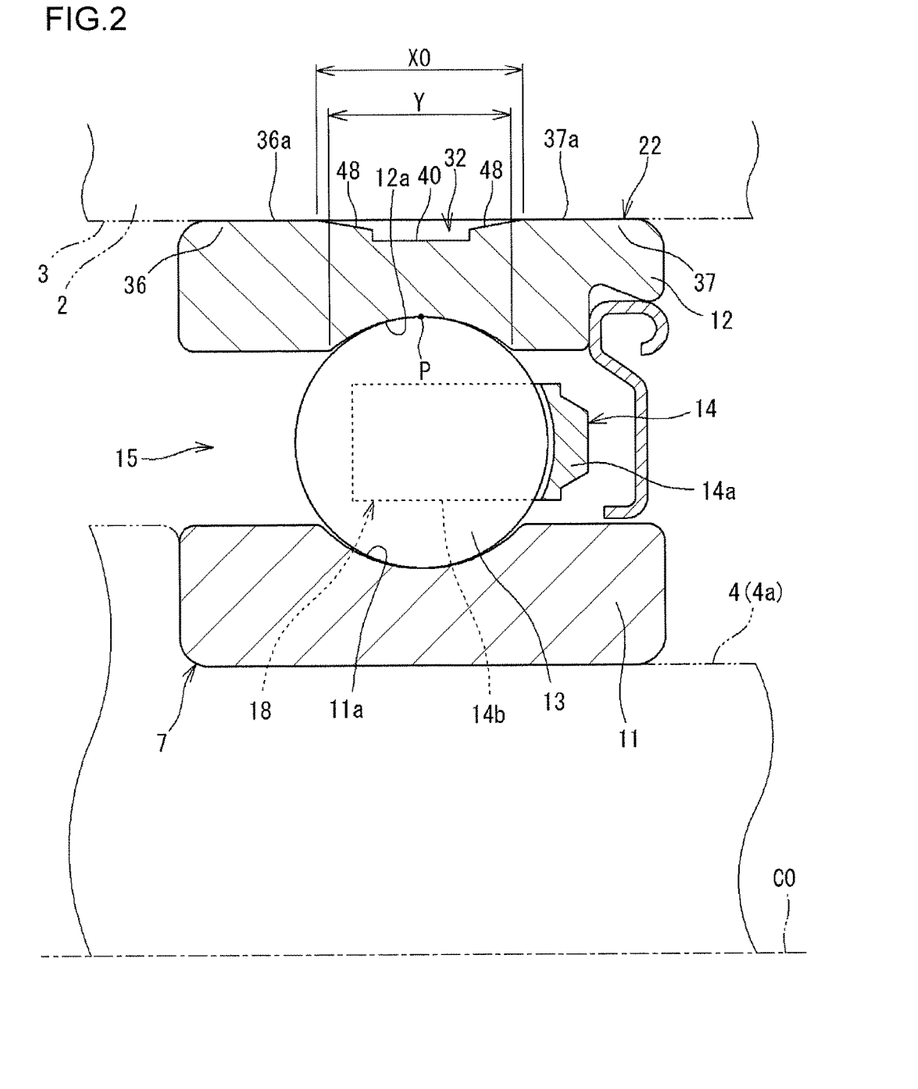
FIG. 2 is a sectional view of the rolling bearing.

FIG. 2 is a sectional view of the rolling bearing 7. The rolling bearing 7 includes an inner ring 11, an outer ring 12, a plurality of rolling elements, and an annular cage 14. The inner ring 11 is externally fitted over and attached to the rotating shaft 4.

The outer ring 12 is attached to the housing inner peripheral surface 3. The rolling elements are interposed between the inner ring 11 and the outer ring 12. The cage 14 holds the rolling elements. The rolling elements in the present embodiment are balls 13, and the rolling bearing 7 depicted in FIG. 2 is a deep groove ball bearing. As described above, a load is imposed on the rolling bearing 7 in one direction along the axial direction.

In the present embodiment, the inner ring 11 and the rotating shaft 4 are assembled in an "interference fit" state. The inner ring 11 is closely fitted over the rotating shaft 4 so as to be rotatable integrally with the rotating shaft 4. In contrast, the outer ring 12 is attached to the fixed housing 2. The outer ring 12 is assembled on the housing inner peripheral surface 3 in a "clearance fit" state. Thus, in a use state where the rotating shaft 4 is rotating along with the inner ring 11, creep (slip of the outer ring 12 with respect to the housing 2 in a circumferential direction) may occur between the outer ring 12 and the housing 2. The creep will further be described below.

An inner-ring raceway groove (raceway surface) 11*a* is formed in an outer peripheral surface of the inner ring 11 such that the balls 13 roll through the inner-ring raceway groove 11*a*. An outer-ring raceway groove (raceway surface) 12*a* is formed in an inner peripheral surface of the inner ring 11 such that the balls 13 roll through the outer-ring raceway groove 12*a*. The balls 13 are provided in an annular space 15 between the inner ring 11 and the outer ring 12. Rotation of the rolling bearing 7 (rotation of the inner ring 11) allows the balls 13 to roll through the inner-ring raceway groove 11*a* and the outer-ring raceway groove 12*a* while being held by the cage 14.

The cage 14 holds the balls 13 at predetermined intervals (regular intervals) along the circumferential direction. The cage 14 has a plurality of pockets 18 formed along the circumferential direction and in which the balls 13 are housed. The cage 14 of the present embodiment has a circular ring portion 14*a* and a plurality of cage bars 14*b*. The circular ring portion 14*a* is provided on one side of the balls 13 in the axial direction. The cage bars 14*b* extend from the circular ring portion 14*a* toward the other side in the axial direction. Each of the pockets 18 is arranged on the other side (in FIG. 2, on the left side) of the circular ring portion 14*a* and between the cage bars 14*b*, 14*b* adjacent to each other. The cage 14 may be in any other form, and for example, the circular ring portion may also be provided on the other side of the balls 13 in the axial direction.

In the rolling bearing 7 in the present embodiment, the outer ring 12, which is a fixed ring, is attached to the housing 2 (mating member). An outer peripheral surface of the outer ring 12 corresponds to a fitting surface 22 for the housing 2 (inner peripheral surface 3). As depicted in FIG. 2, an annular groove 32 is formed in the fitting surface 22. The annular groove 32 is a circumferentially continuous annular groove and has a sectional shape that remains the same along the circumferential direction. The annular groove 32 is formed in a central portion of the fitting surface 22 in the axial direction. A position radially outward of a contact point P of the ball 13 that contacts the outer-ring raceway groove 12*a* coincides with the center of the annular groove 32 in the axial direction.

In the diagrams depicting the annular groove 32, the annular groove 32 is illustrated to be deep in order to facilitate understanding of the shape thereof. However, the depth of the annular groove 32 is actually very small compared to the thickness of the outer ring 12, and may be, for example, less than 1 mm.

Now, creep will be described which may occur between the housing 2 and the outer ring 12. The following three types of creep may occur in the rolling bearing 7.

A bearing rotating direction described below is, in the present embodiment, a rotating direction of the inner ring 11, which is a rotating ring.

First creep: creep in which the outer ring 12 slips slowly in the same direction as the bearing rotating direction Second creep: creep in which the outer ring 12 slips quickly in the same direction as the bearing rotating direction Third creep: creep in which the outer ring 12 slips in a direction opposite to the bearing rotating direction The first creep is likely to occur when a heavy load is imposed on the rolling bearing 7 in the radial direction. The first creep is expected to occur in accordance with the following mechanism. That is, if a heavy load is imposed on the rolling bearing 7 in the radial direction, the balls 13 pass through the outer-ring raceway groove 12*a* under the high load, and at this time, the outer peripheral side of the outer ring, which is located immediately below the balls 13, is partly elastically deformed. Since the balls 13 move along the outer-ring raceway groove 12*a*, the outer ring 12 is subjected to pulsating deformation (displacement). Thus, relative slip results from elastic deformation of a contact area between the outer ring 12 and the housing 2, and is expected to cause the first creep.

The second creep is the same as the first creep in the moving direction (slip direction) of the outer ring 12. However, the second creep is likely to occur when no load is imposed on the rolling bearing 7 in the radial direction. In other words, the second creep is expected to result from rotation of the outer ring 12 in conjunction with rotation of the inner ring 11 when no load is imposed in the radial direction.

In the third creep, the outer ring 12 moves (slips) in the direction opposite to the moving (slip) direction in the first and second creeps. The third creep is expected to result from centrifugal whirling of the outer ring 12 along the housing inner peripheral surface 3 caused by an unbalanced load in the radial direction.

In the rolling bearing 7 in the present embodiment, the annular groove 32 is formed in the fitting surface 22 of the outer ring 12 and radially outward of the outer-ring raceway groove 12*a* in order to suppress the first creep. The annular groove 32 depicted in FIG. 2 has a groove width X0 larger than a width Y of the outer-ring raceway groove 12*a* in the axial direction. However, the annular groove 32 may have a groove width X0 equal to or smaller than the width Y of the outer-ring raceway groove 12*a* in the axial direction.

The annular groove 32 is formed in the fitting surface 22 of the outer ring 12, which is fitted on the housing 2. This allows restraint of the relative slip caused by elastic deformation as described above in connection with the generating mechanism of the first creep, enabling the first creep to be suppressed. In other words, when a heavy load is imposed on the rolling bearing 7 in the radial direction, an area of the outer ring 12 located radially outward of the outer-ring raceway groove 12a is elastically deformed outward in the radial direction (the diameter of the outer ring 12 is expanded). However, the annular groove 32 formed in this area allows the elastic deformation (diameter expansion) to occur mainly within the range of the annular groove 32. Thus, the effect of the direct contact between the elastically deformed portion and the housing inner peripheral surface 3 can be reduced. As a result, (substantially) no elastic deformation is transmitted to the housing 2, or the mating member, suppressing possible first creep between the outer ring 12 and the housing 2. As described above, the annular groove 32 serves as a groove (clearance groove) for suppression of the first creep.

Formation of the annular groove 32 as described above provides the outer ring 12 with cylindrical portions 36, 37 on the opposite sides of the annular groove 32 in the axial direction. Outer peripheral surfaces 36a, 37a of the cylindrical portions 36, 37 are cylindrical surfaces centered around a bearing center line C0 of the rolling bearing 7 and can come into contact with the housing 2 (inner peripheral surface 3) along the housing 2. As depicted in FIG. 2, in a section including the bearing center line C0, the outer peripheral surfaces 36a, 37a of the cylindrical portions 36, 37 each have a linear sectional shape parallel to the bearing center line C0.

Figure 3:
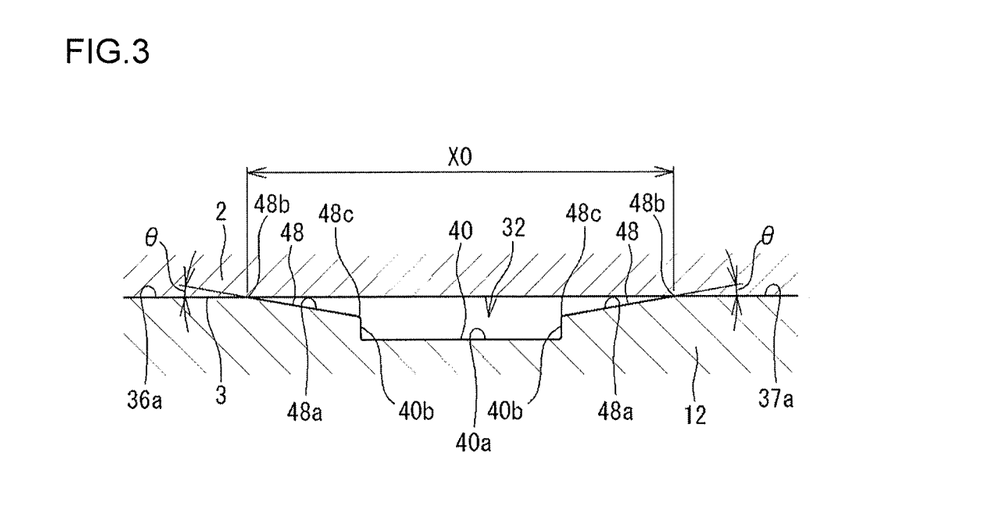
FIG. 3 is a diagram illustrating an annular groove and a periphery thereof.

A configuration of the annular groove 32 will be described. FIG. 3 is an enlarged sectional view depicting the annular groove 32 and a periphery thereof. The annular groove 32 has a groove main body portion 40 in the center of the annular groove 32 in the axial direction and inclined groove portions 48 provided on opposite sides of the groove main body portion 40 in the axial direction. In the annular groove 32 depicted in FIG. 3, the groove main body portion 40 has a cylindrical groove bottom surface 40a and circular-ring-shaped groove side surfaces 40b, 40b provided on opposite sides of the groove bottom surface 40a in the axial direction. The groove main body portion 40 is shaped like a recessed groove with a rectangular section.

The pair of inclined groove portions 48, 48 has an inclined shape (tapered shape) such that the depth of each inclined groove portion 48 increases toward the groove main body portion 40. The inclined groove portion 48 is shallower than the groove main body portion 40 at an end point 48c of the inclined groove portion 48, which is the deepest point (a point closest to the groove main body portion 40). A crossing between a bottom surface 48a of the inclined groove portion 48 and the outer peripheral surface 36a (37a) corresponds to a start point 48b of the inclined groove portion 48. A crossing between the bottom surface 48a of the inclined groove portion 48 and the side surface 40b of the groove main body portion 40 corresponds to an end point 48c of the inclined groove portion 48. The bottom surface 48a of the inclined groove portion 48 has a linear inclined shape in a section including the bearing center line C0. An angle formed between the outer peripheral surface 36a (37a) and an extension of the bottom surface 48a is denoted as θ in FIG. 3.

Figure 4:
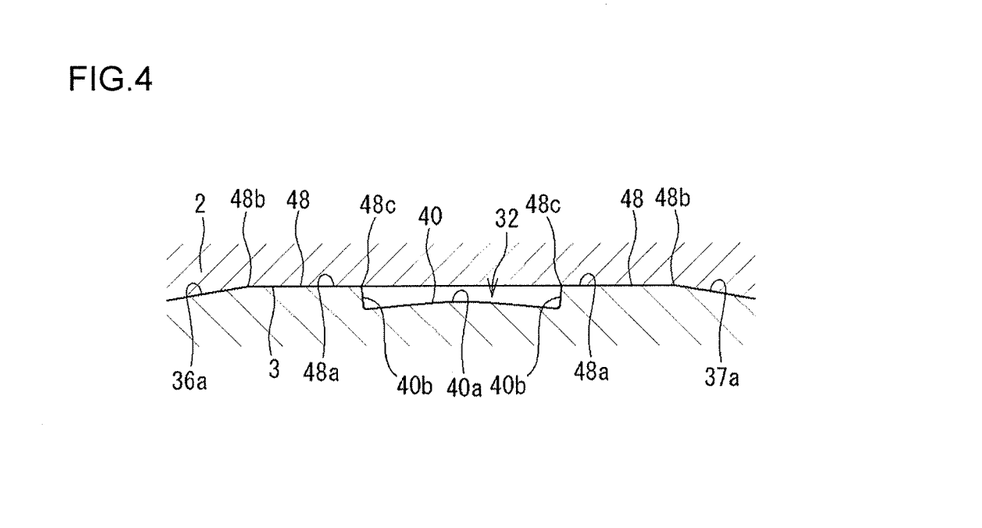
FIG. 4 is a diagram illustrating the annular groove and the periphery thereof.

The shape of the inclined groove portion 48 (inclination angle θ) is set as follows. In FIG. 2, a radial load imposed on the rolling bearing 7 elastically deforms the outer ring 12, which bulges outward in the radial direction. As depicted in FIG. 4, the inclined groove portions 48, 48 are shaped to (at least partly) come into surface contact with the housing inner peripheral surface 3 when the outer ring 12 is elastically deformed as described above. In contrast, the inclined groove portions 48, 48 are also shaped so as not to come into contact with the housing 2 as depicted in FIG. 3 when the radial load is lighter than the load in the state illustrated in FIG. 4. Thus, in the annular groove 32 depicted in FIG. 3, each of the inclined groove portions 48, 48 is allowed to be in contact with the housing 2 (see FIG. 3) or out of contact with the housing 2 (see FIG. 4) depending on the magnitude of the radial load imposed on the outer ring 12.

As described above, the inclined shape (inclination angle θ) of the inclined groove portion 48 is set such that the bottom surface 48a comes into surface contact with the housing inner peripheral surface 3 when a strain on the outer ring 12 increases as the radial load imposed on the outer ring 12 becomes relatively heavy. In other words, the shape of the inclined groove portion 48 is set such that the bottom surface 48a approaches the cylindrical surface centered around the bearing center line C0 when a heavy radial load is imposed on the outer ring 12 to elastically deform the outer ring 12 at the inclined groove portion 48.

In the annular groove 32 having the inclined groove portions 48, 48 as described above, when the radial load imposed on the outer ring 12 becomes relatively heavy to place an increased strain on the outer ring 12, at least a part of each inclined groove portion 48 comes into contact with the housing 2 via the surface of the groove portion rather than via a corner thereof. This enables prevention of a local increase in the contact surface pressure on the housing 2. When a relatively light radial load is imposed on the outer ring 12 to place a low strain on the outer ring 12, the inclined groove portion 48 does not come into contact with the housing 2. Thus, the annular groove 32 includes the groove main body portion 40 and the inclined groove portions 48, 48 and has an increased groove width X0 (see FIG. 3). As a result, creep suppression effect can be improved.

Figure 5:
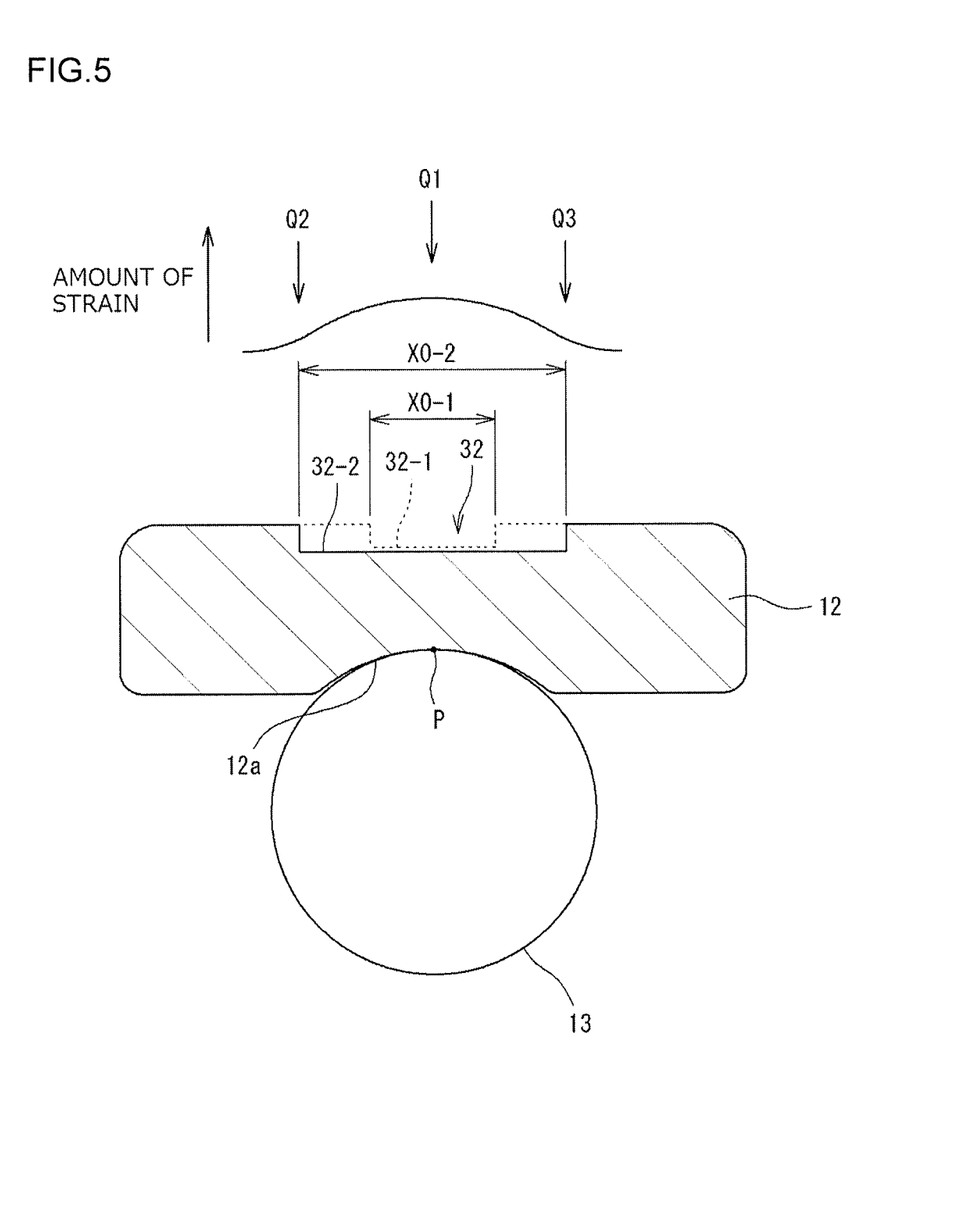
FIG. 5 is a diagram illustrating functions of the annular groove.

Improvement of the creep suppression effect based on the increased groove width X0 of the annular groove 32 will be described. When the outer ring 12 is elastically deformed outward in the radial direction by a radial load, the amount of strain placed on an outer peripheral portion of the outer ring 12 is high in a central portion Q1 close to the contact point P between each of the balls 13 and the outer-ring raceway surface 12a and decreases toward opposite sides Q2, Q3 in the axial direction. The amount of strain placed on the outer peripheral portion of the outer ring 12 is depicted in an upper area of FIG. 5. In FIG. 5, the annular groove 32 is depicted as a rectangular groove in order to facilitate description. To suppress the first creep as described above, the annular groove 32 is preferably formed in an area of the outer ring 12 on which a large amount of strain is placed, wherever possible. Thus, compared to formation of an annular groove 32-1 depicted by a dashed line in FIG. 5 (groove width X0-1), formation of an annular groove 32-2 depicted by a continuous line in FIG. 5 (groove width X0-2) allows the area on which a large amount of strain is placed to be prevented from coming into contact with the housing 2 (see FIG. 2). This serves to suppress the first creep, which results from pulsating deformation (displacement) of the outer ring 12. As described above, an increased groove width X0 of the annular groove 32 allows the first creep to be more effectively suppressed.

Thus, in the rolling bearing 7 depicted in FIG. 2, the inclined groove portions 48, 48 are formed on the opposite sides of the groove main body portion 40 in the axial direction to increase the groove width X0 of the annular groove 32. This allows the annular groove 32 to more effectively suppress the first creep.

As described above, the case where a relatively heavy radial load is imposed on the rolling bearing 7 (a large amount of strain is placed on the rolling bearing 7) includes, for example, the case where, with the rotating apparatus (see FIG. 1) stopped or rotating at low speed, a high torque is exerted on the rotating shaft 4 in order to rapidly increase the rotation speed. In contrast, the case where a relatively light radial load is imposed on the rolling bearing 7 (a small amount of strain is placed on the rolling bearing 7) includes, for example, the case where, during steady operation, a low torque is exerted on the rotating shaft 4.

As described above, in the rolling bearing 7 depicted in FIG. 2, the inclined groove portions 48, 48 of the annular groove 32 formed in the outer ring 12 each have an inclined shape such that the inclined groove portions 48, 48 can come into contact with the housing 2 as depicted in FIG. 4 when the outer ring 12 is elastically deformed by the radial load received from the balls 13. Thus, surface contact of the inclined groove portion 48 with housing 2 can be achieved as depicted FIG. 4, instead of contact of the corner 99 with the housing 97 as in the related art (see FIG. 10). This enables suppression of a local increase in the contact surface pressure on the housing 2.

Figure 6:
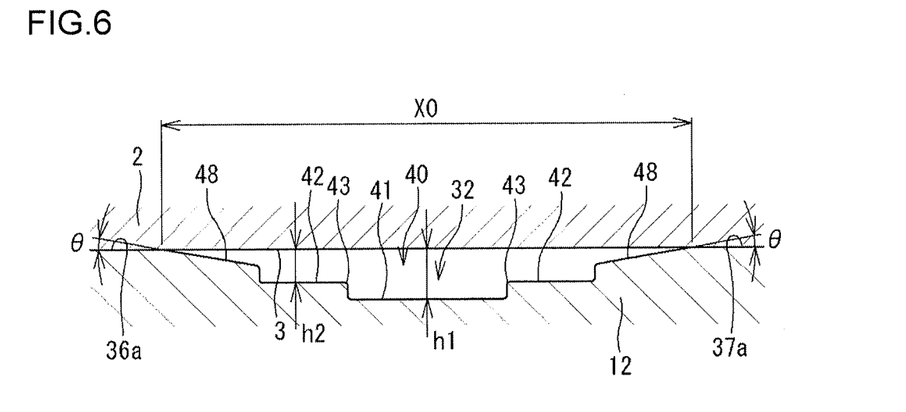
FIG. 6 is a sectional view illustrating a variation of the annular groove.

FIG. 6 is a sectional view illustrating a variation of the annular groove 32, The groove main body portion 40 of the annular groove 32 has a first groove 41 in the center of the groove main body portion 40 in the axial direction and second grooves 42, 42. The second grooves 42, 42 are formed on the opposite sides of the first groove 41 in the axial direction. The first groove 41 is continuous with each of the second grooves 42, 42. The groove main body portion 40 (annular groove 32) in the present embodiment is shaped laterally symmetrically (in FIG. 6) with respect to the first groove 41. The first groove 41 has a first depth h1. Each of the second grooves 42, 42 has a second depth h2 smaller than the first depth h1 of the first groove 41. Therefore, the groove main body portion 40 is formed as a recessed groove with a stepped shape that is deeper at the center thereof. The depths h1, h2 are depth dimensions from outer peripheral surfaces 36a, 37a. The inclined groove portions 48, 48 similar to those depicted in FIG. 3 are provided on the opposite sides of the second grooves 42, 42 in the axial direction.

Functions of the annular groove 32 depicted in FIG. 6 will be described.

Figure 7:
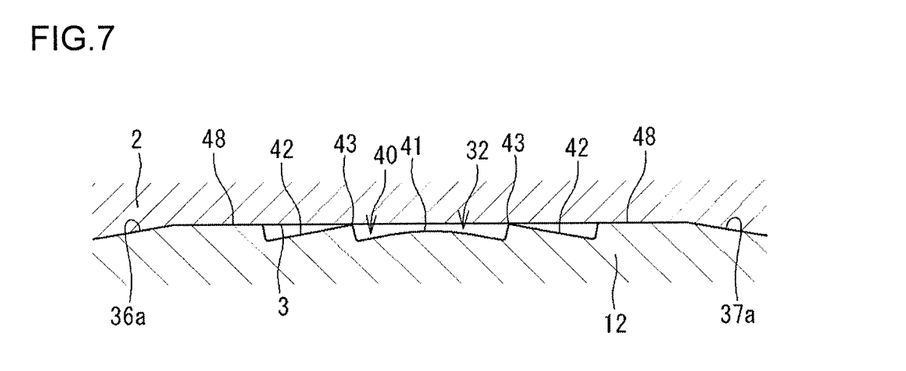
FIG. 7 is a diagram illustrating functions of the annular groove depicted in FIG. 6.

As described above, when a radial load is imposed on the rolling bearing 7, the outer ring 12 is elastically deformed by a radially outward load received from the balls 13. When the outer ring 12 is elastically deformed by a relatively heavy radial load, a portion 43 of each of the second grooves 42 that is closer to the first groove 41 comes into contact with the housing 2 (inner peripheral surface 3) as depicted in FIG. 7. In other words, each second groove 42 (see FIG. 6) has the groove depth (h2) at which the portion 43 can come into contact with the housing 2.

In contrast, even when a relatively heavy radial load, namely, a radial load heavy enough to bring the portion 43 into contact with the housing 2, is imposed on the outer ring 12, the first groove 41 is precluded from coming into contact with the housing 2 (inner peripheral surface 3). That is, the first groove 41 has the groove depth (h1) at which the first groove 41 is precluded from coming into contact with the housing 2.

In the annular groove 32 depicted in FIG. 6, the depth h2 of each second groove 42 is also set as follows. A radial load imposed on the rolling bearing 7 elastically deforms the outer ring 12. The second depth h2 of each second groove 42 is set such that a large amount of strain resulting from the elastic deformation brings the portions 43 of the second grooves 42 into contact with the housing 2 as depicted in FIG. 7, whereas a small amount of strain resulting from the elastic deformation does not bring the portions 43 of the second grooves 42 into contact with the housing 2 as depicted in FIG. 6. Thus, in the present embodiment, the portions 43 of the second grooves 42 are allowed to be in contact with the housing 2 (see FIG. 7) or out of contact with the housing 2 (see FIG. 6) depending on the magnitude of the radial load imposed on the outer ring 12.

Figure 8:
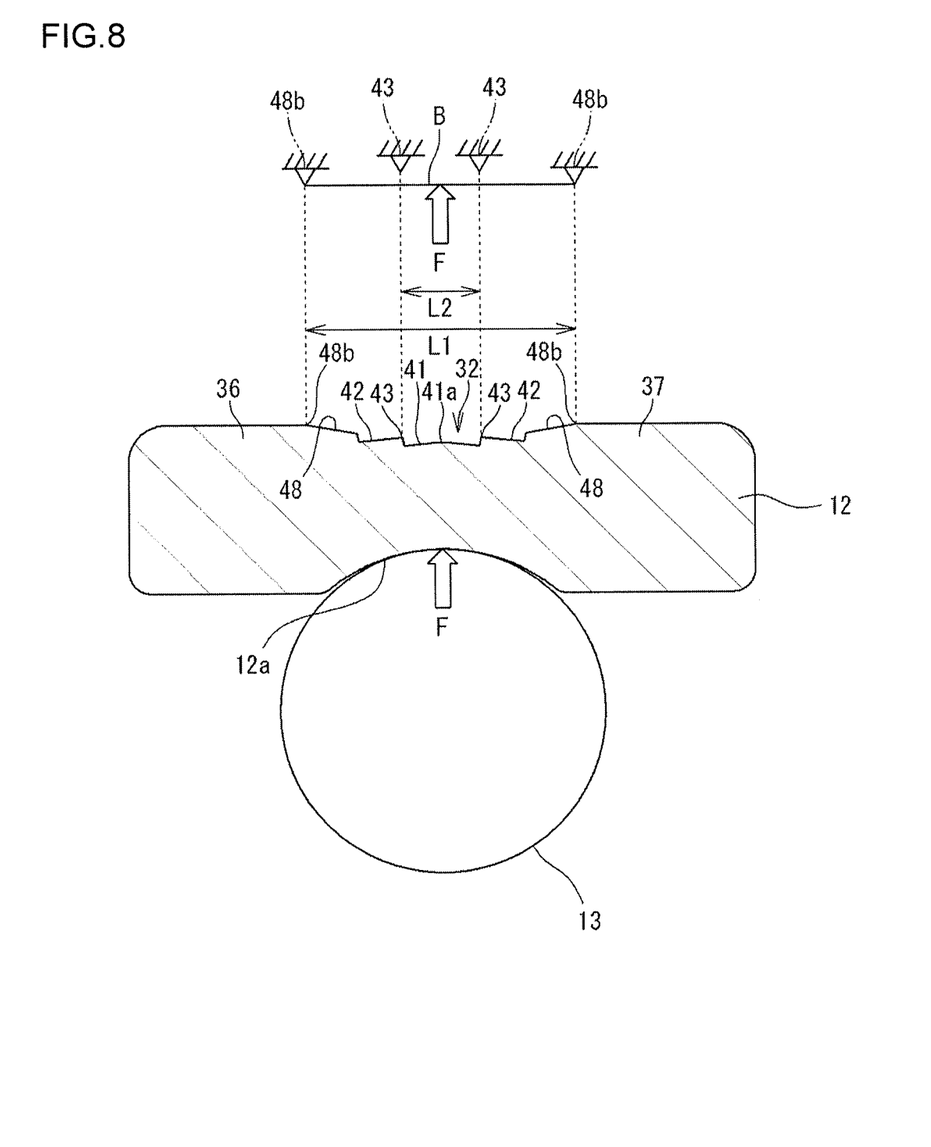
FIG. 8 is a diagram illustrating the annular groove.

As described above, in the rolling bearing 7 depicted in FIG. 6, when a relatively heavy radial load is imposed on the rolling bearing 7 to elastically deform the outer ring 12 under the radial load received from the balls 13, the portion 43 of each second groove 42 that is closer to the first groove 41 can come into contact with the housing 2 as depicted in FIG. 7. With the portions 43 in contact with the housing 2, a fraction of the radial load is transmitted to the housing 2 through the portions 43 of the second grooves 42. Thus, a possible stress in the annular groove 32 can be reduced. In other words, the portions 43, 43 included in the groove main body portion 40 come into contact with the housing 2. Thus, given the outer ring 12 is a two-point support beam B as depicted in FIG. 8, the portions 43, 43 serve as supports of the beam B. A short distance L2 between the supports 43, 43 (L2<L1) enables a reduction in a possible stress on the central portion of the annular groove 32 (the central portion of the beam B). The distance L1 depicted in FIG. 8 is the distance, which is measured when the portions 43 of the second grooves 42 are out of contact with the housing 2, between the supports of the two-point support beam B given the outer ring 12 is the two-point support beam B.

In the annular groove 32 depicted in FIG. 6, when a relatively light load is imposed on the outer ring 12 to place a low strain on the outer ring 12, the portions 43, 43 of the second grooves 42, 42 are out of contact with the housing 2 as described above (see FIG. 6). This enables an increase in the groove width X0 of the annular groove 32, which includes the first groove 41 and the second grooves 42, 42. As a result, the creep suppression effect can be improved.

As described above, the portions 43 of the second grooves 42 are allowed to be in contact with the housing 2 (see FIG. 7) or out of contact with the housing 2 (see FIG. 6) depending on the magnitude of the radial load imposed on the outer ring 12. In this configuration, the groove width X0 of the annular groove 32 is made as large as possible to improve the creep suppression effect. Even when the radial load increases, the portions 43 of the second grooves 42 come into contact with the housing 2 to enable a reduction in a possible stress on the annular groove 32.

Even if an increased radial load imposed on the outer ring 12 brings the portions 43 of the second grooves 42 into contact with the housing 2, the first groove 41 is out of contact with the housing 2. This enables possible creep of the outer ring 12 to be effectively suppressed.

Figure 9:
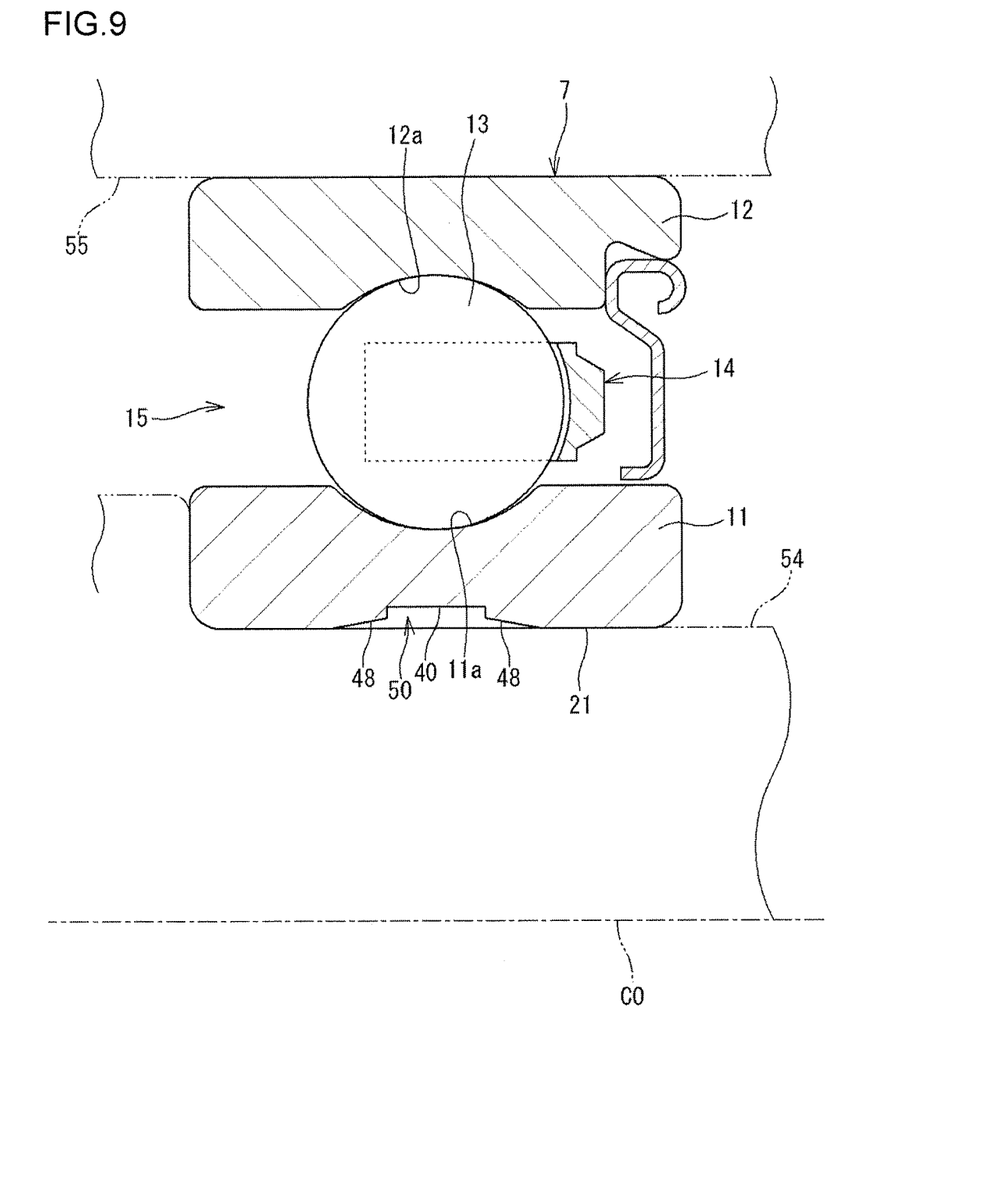
FIG. 9 is a sectional view depicting another embodiment of the rolling bearing.

In the above-described embodiment (see FIG. 1), the inner ring 11 is a rotating ring that rotates integrally with a mating member (rotating shaft 4) to which the inner ring 11 is attached. The outer ring 12 is a fixed ring fixed to the mating member (housing 2) (though creeping is possible) to which the outer ring 12 is attached. However, the invention may have any configuration so long as one of the inner ring 11 and the outer ring 12 is a rotating ring and the other is a fixed ring. Unlike the above-described embodiments, a configuration is possible in which the inner ring 11 attached to a shaft 54 is a fixed ring, whereas the outer ring 12 is a rotating ring that rotates integrally with a housing 55 as depicted in FIG. 9. In this case, the inner ring 11 and the shaft 54 are in a clearance fit state, and the inner ring 11 creeps with respect to the shaft 54. Thus, an annular groove 50 is formed (as is the case with the embodiment in FIG. 2) in the fitting surface (inner peripheral surface) 21 of the inner ring 11 that is fitted on the shaft 54 serving as a mating member. The annular groove 50 has the groove main body portion 40 and the inclined groove portions 48, 48 provided on the opposite sides of the groove main body portion 40 in the axial direction. As is the case with the embodiment depicted in FIG. 2, each of the inclined groove portions 48, 48 is formed to be shallower than the groove main body portion 40 such that the depth of the inclined groove portion 48 increases toward the groove main body portion 40. Each inclined groove portion 48 has an inclined shape such that the inclined groove portion 48 can come into contact with the shaft 54 when the inner ring 11 is elastically deformed inward in the radial direction under a radial load received from the balls 13. Components related to the annular groove 32 in the embodiments depicted in FIG. 2 and other figures can be applied to the annular groove 50 depicted in FIG. 9.

The embodiments as disclosed above are illustrative in every way and are not restrictive. In other words, the rolling bearing in the invention is not limited to the illustrated forms but may be in any other form within the scope of the invention. With reference to FIG. 1, the rolling bearing 7 has been described as a bearing for motors to which a preload is applied. However, the rolling bearing 7 may be used for applications other than motors. The rolling bearing in the invention is applicable to rotating equipment involving the creep problem. The rolling bearing may be an angular ball bearing instead of the deep groove ball bearing. The rolling elements may be other than balls and may be cylindrical rollers or tapered rollers.

In the invention, the annular groove is formed in the fixed ring to allow possible creep to be suppressed and also to enable suppression of a local increase in the contact surface pressure on the mating member to which the fixed ring is attached.

What is claimed is:

1. A rolling bearing comprising:
   an inner ring;
   an outer ring;
   a plurality of rolling elements interposed between the inner ring and the outer ring; and
   a cage that holds the rolling elements, one of the inner ring and the outer ring being a rotating ring and the other being a fixed ring, wherein
   a fitting surface of the fixed ring attached to a mating member is formed as a first partial peripheral surface and a second partial peripheral surface each of which is a surface of the fixed ring facing the mating member in a radial direction, the first partial peripheral surface being arranged on one side in an axial direction, the second partial peripheral surface being arranged on the other side in the axial direction, and an annular groove for creep suppression is formed between the first partial peripheral surface and the second partial peripheral surface,
   the annular groove has a groove main body portion and inclined groove portions located on opposite sides of the groove main body portion in the axial direction and formed to be shallower than the groove main body portion such that a depth of each of the inclined groove portions increases toward the groove main body portion, and
   the inclined groove portions come into contact with the mating member when the fixed ring is elastically deformed by a radial load received from the rolling elements.

2. The rolling bearing according to claim 1, wherein the groove main body portion has a first groove in a center of the groove main body portion in the axial direction and second grooves located on opposite sides of the first groove in the axial direction and each formed to be continuous with the first groove and to be shallower than the first groove, and
   each of the second grooves has a groove depth at which a portion of the second groove that is closer to the first groove comes into contact with the mating member when the fixed ring is elastically deformed under the radial load received from the rolling elements.

3. The rolling bearing according to claim 2, wherein the portion of each of the second grooves is in contact with or out of contact with the mating member depending on a magnitude of the radial load imposed on the fixed ring.

4. The rolling bearing according to claim 1, wherein each of the inclined groove portions is in contact with or out of contact with the mating member depending on a magnitude of the radial load imposed on the fixed ring.

5. The rolling bearing according to claim 4, wherein the groove main body portion has a first groove in a center of the groove main body portion in the axial direction and second grooves located on opposite sides of the first groove in the axial direction and each formed to be continuous with the first groove and to be shallower than the first groove, and
   each of the second grooves has a groove depth at which a portion of the second groove that is closer to the first groove comes into contact with the mating member when the fixed ring is elastically deformed under the radial load received from the rolling elements.

6. The rolling bearing according to claim 5, wherein the portion of each of the second grooves is in contact with or out of contact with the mating member depending on a magnitude of the radial load imposed on the fixed ring.

* * * * *